United States Patent
Zhang

(10) Patent No.: US 8,269,385 B2
(45) Date of Patent: Sep. 18, 2012

(54) INJECTION-MOLDED STATOR

(75) Inventor: Xu Zhang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 373 days.

(21) Appl. No.: 12/638,975

(22) Filed: Dec. 15, 2009

(65) Prior Publication Data

US 2010/0225181 A1 Sep. 9, 2010

(30) Foreign Application Priority Data

Mar. 5, 2009 (CN) .......................... 2009 1 0037761

(51) Int. Cl.
*H02K 11/00* (2006.01)

(52) U.S. Cl. ........................................................ 310/71

(58) Field of Classification Search ................... 310/43, 310/71, 184, 194
See application file for complete search history.

(56) References Cited

U.S. PATENT DOCUMENTS

| 4,340,829 | A * | 7/1982 | McCoy ............................ 310/71 |
| 5,350,960 | A * | 9/1994 | Kiri et al. ....................... 310/194 |
| 7,834,496 | B2 * | 11/2010 | Shin et al. ........................ 310/71 |
| 7,932,650 | B2 * | 4/2011 | Seki et al. ........................ 310/71 |
| 2008/0129131 | A1 * | 6/2008 | Shin et al. ........................ 310/71 |

FOREIGN PATENT DOCUMENTS

JP 61218338 A * 9/1986

* cited by examiner

*Primary Examiner* — Tran Nguyen
(74) *Attorney, Agent, or Firm* — Matthias Scholl P.C.; Matthias Scholl

(57) ABSTRACT

An injection-molded stator has a stator core, a coil winding having a head, an end insulating plate having a first groove, and a connector. The end insulating plate is disposed on one end of the stator core, the connector is formed by the head of the coil winding and a power lead electrically connected to each other, and the connector is fixed in the first groove via sealant. The connector is conveniently installed, firmly fixed, orderly distributed and not easily corroded or oxidized, and features simple processing and good sealing effect.

16 Claims, 5 Drawing Sheets

INJECTION-MOLDED STATOR

CROSS-REFERENCE TO RELATED APPLICATIONS

Pursuant to 35, U.S.C. §119 and the Paris Convention Treaty, this application claims the benefit of Chinese Patent Application No. 200910037761.3 filed on Mar. 5, 2009, the contents of which are incorporated herein by reference.

BACKGROUND OF THE INVENTION

1. Field of the Invention

The invention relates to a stator, and more particularly to an injection-molded stator.

2. Description of the Related Art

In a conventional motor, a connector is formed by a head of a coil winding and a power lead electrically connected to each other via tin soldering or a terminal, and usually disposed inside the motor. However, there are several problems with the structure: the connector is unfixed and disorderly distributed in the motor, which causes great inconvenience for installation; the unfixed connector often randomly swings in the motor, and safety of the motor cannot be ensured; the unfixed connector is easily detached; finally, the head is easily corroded or oxidized by tin if the head of the coil winding is connected to the power lead via tin soldering.

To solve the above-mentioned problems, a seal housing is used to receive and fix the connector therein. But processing of the seal housing is complex, and sealing effect thereof is not good enough.

SUMMARY OF THE INVENTION

In view of the above-described problem, it is one objective of the invention to provide an injection-molded motor in which a connector is conveniently installed, firmly fixed, orderly distributed and not easily corroded or oxidized, and features simple processing and good sealing effect.

To achieve the above objectives, in accordance with one embodiment of the invention, provided is an injection-molded stator, comprising a stator core, a coil winding having a head, an end insulating plate having a first groove, and a connector. The end insulating plate is disposed on one end of the stator core, the connector is formed by the head of the coil winding and a power lead electrically connected to each other, and the connector is fixed in the first groove via sealant.

In a class of this embodiment, a second groove is disposed on the end insulating plate and above the first groove and operates to receive the sealant.

In a class of this embodiment, a first outlet is disposed between the first groove and the second groove.

In a class of this embodiment, the sealant in the second groove flows in the first groove via the first outlet whereby fixing the connector in the first groove.

In a class of this embodiment, a third groove is disposed on the end insulating plate and in the vicinity of the first groove.

In a class of this embodiment, a second outlet is disposed between the first groove and the third groove.

In a class of this embodiment, redundant sealant in the first groove flows in the third groove via the second outlet.

In a class of this embodiment, a width of a middle portion of the first groove is smaller than that of each of both ends thereof.

In a class of this embodiment, a first cylinder is disposed on the end insulating plate, and the head of the coil winding is wrapped on the first cylinder before being connected to the power lead.

In a class of this embodiment, a hook is disposed on the first cylinder and is in the shape of an umbrella or a cuspate hat.

In a class of this embodiment, multiple second cylinders are disposed on the end insulating plate.

In a class of this embodiment, multiple teeth protrude from the side wall of the stator core, a slot is formed between adjacent teeth, the coil winding is received in the slot and wrapped around the tooth, and a transition line of an in-phase coil winding between two teeth is hang on the second cylinder.

In a class of this embodiment, a fourth groove is disposed on any one of the second cylinders and operates to prevent erroneous wire winding.

In a class of this embodiment, the coil winding is an enameled copper coil or an enameled aluminum coil.

In a class of this embodiment, the coil winding is connected to the power lead via a terminal.

In a class of this embodiment, a chin portion is disposed in the terminal whereby penetrating enamel leather of the coil winding and electrically connecting the coil winding to the power lead.

In a class of this embodiment, multiple holes are disposed on the end insulating plate and said stator core.

In a class of this embodiment, the hole operates to receive an elastic sleeve.

Advantages of the invention comprise: 1) the second groove and the first outlet make sealing processing convenient and easy; 2) the third groove and the second outlet prevent the sealant from flowing out and ensure the connector is fully sealed by the sealant; 3) structure of the first groove ensures the connector to be firmly fixed and not easily detached; 4) the first cylinder makes it convenient to find the head of the coil winding when the head is connected to the power lead; 5) the hook makes it convenient to wrap the head of the coil winding on the first cylinder; 6) the fourth groove prevents erroneous winding and makes it convenient for operating and testing; 7) a wide variety of materials can be used to make the coil winding; 8) the chin portion penetrates enamel leather of the coil winding and simplifies the production process; 9) the screw and the elastic sleeve are tightly fit with each other, and thus ensuring convenient installation, accurate positioning and good shock absorbing effect, bearing axial locking force, and preventing the end insulating plate from deforming or breaking.

BRIEF DESCRIPTION OF THE DRAWINGS

The invention is described hereinafter with reference to accompanying drawings, in which.

DETAILED DESCRIPTION OF THE EMBODIMENTS

Figure 1:
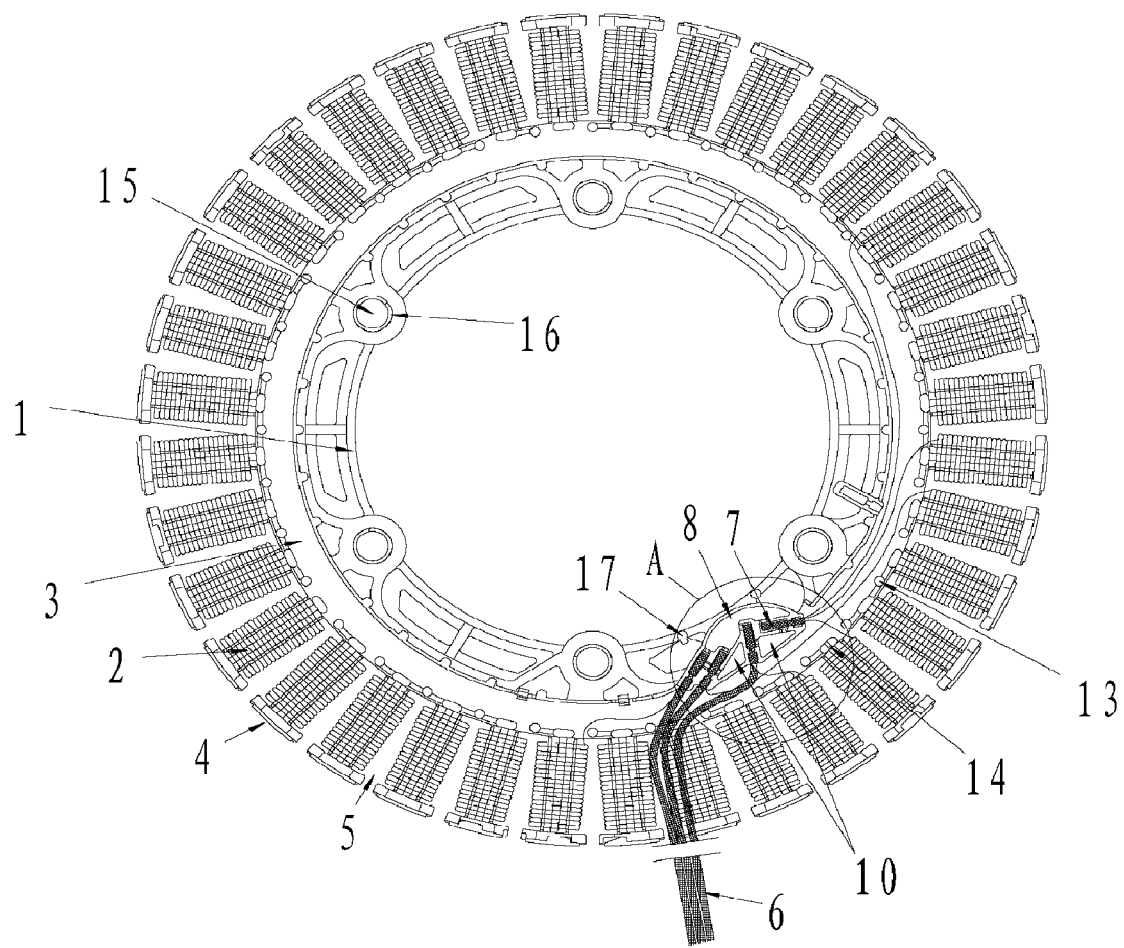
FIG. 1 is a schematic view of an injection-molded motor of an embodiment of the invention.
Figure 2:
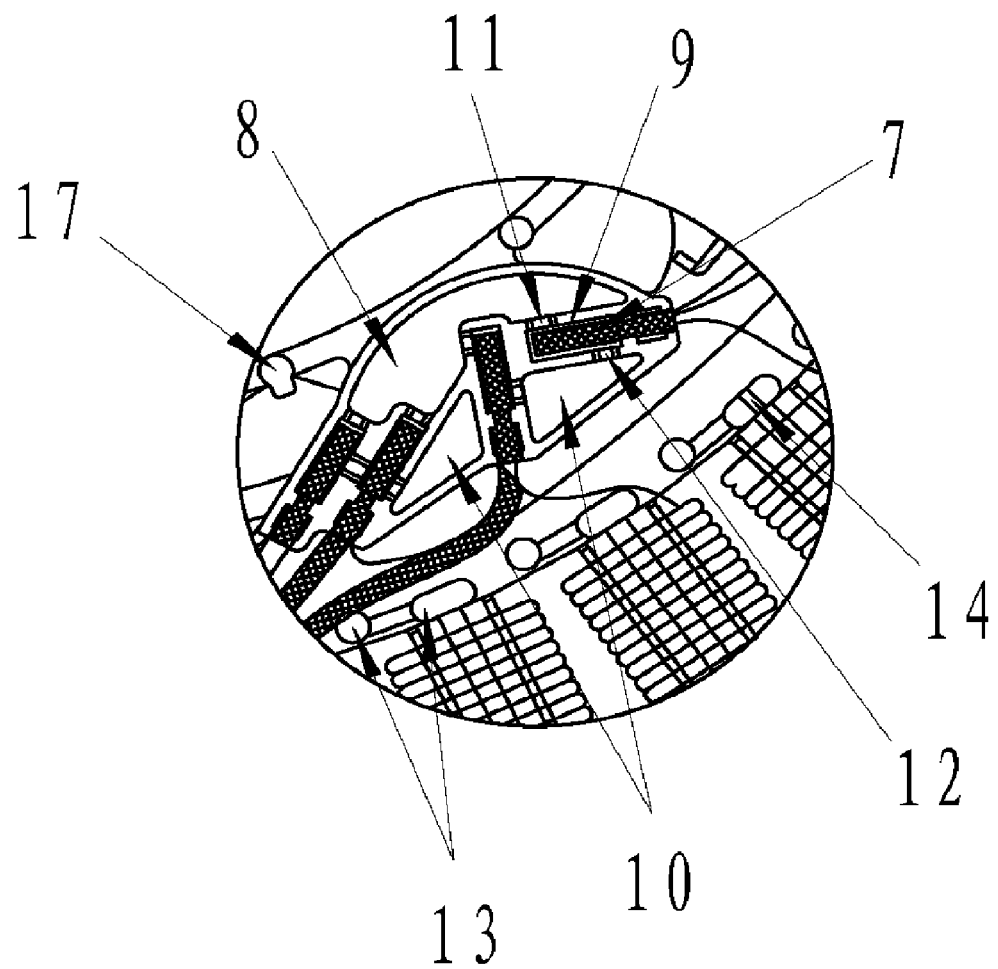
FIGS. 2 and 5 are enlarged views of an A portion of FIG. 1.
Figure 3:
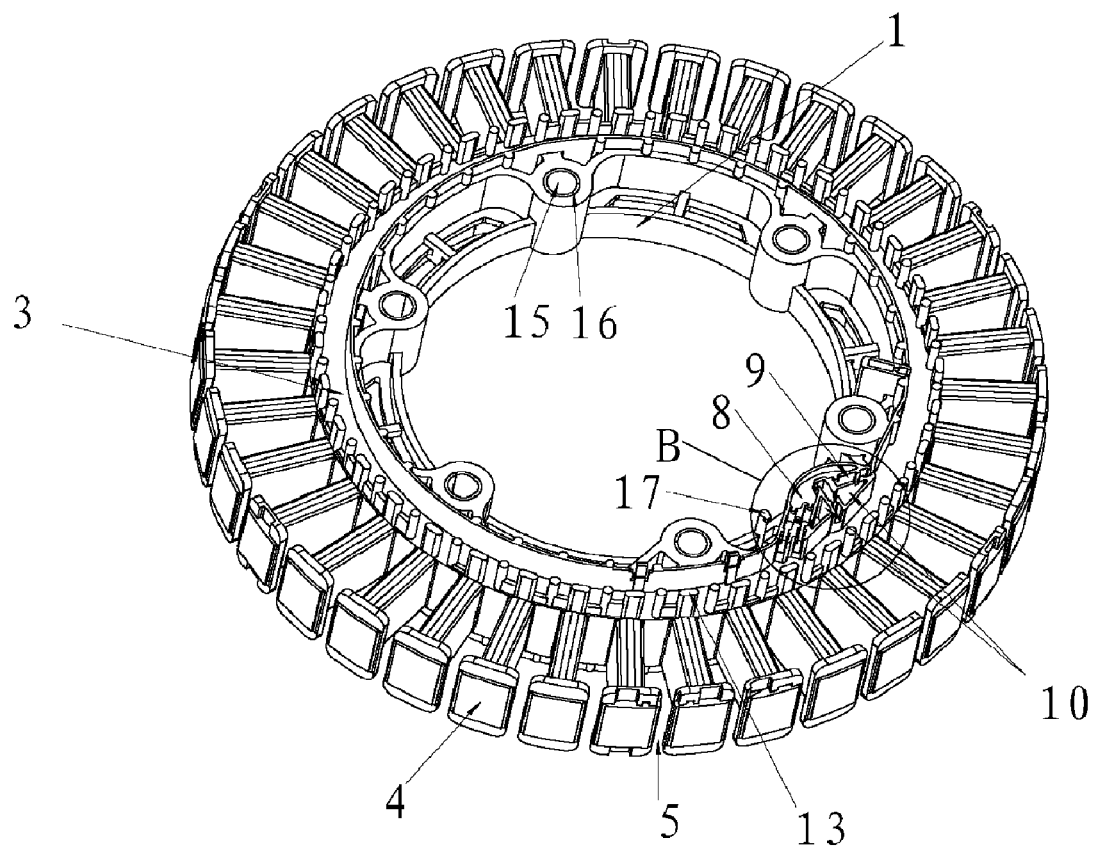
FIG. 3 is a perspective view of an injection-molded motor of an embodiment of the invention.
Figure 4:
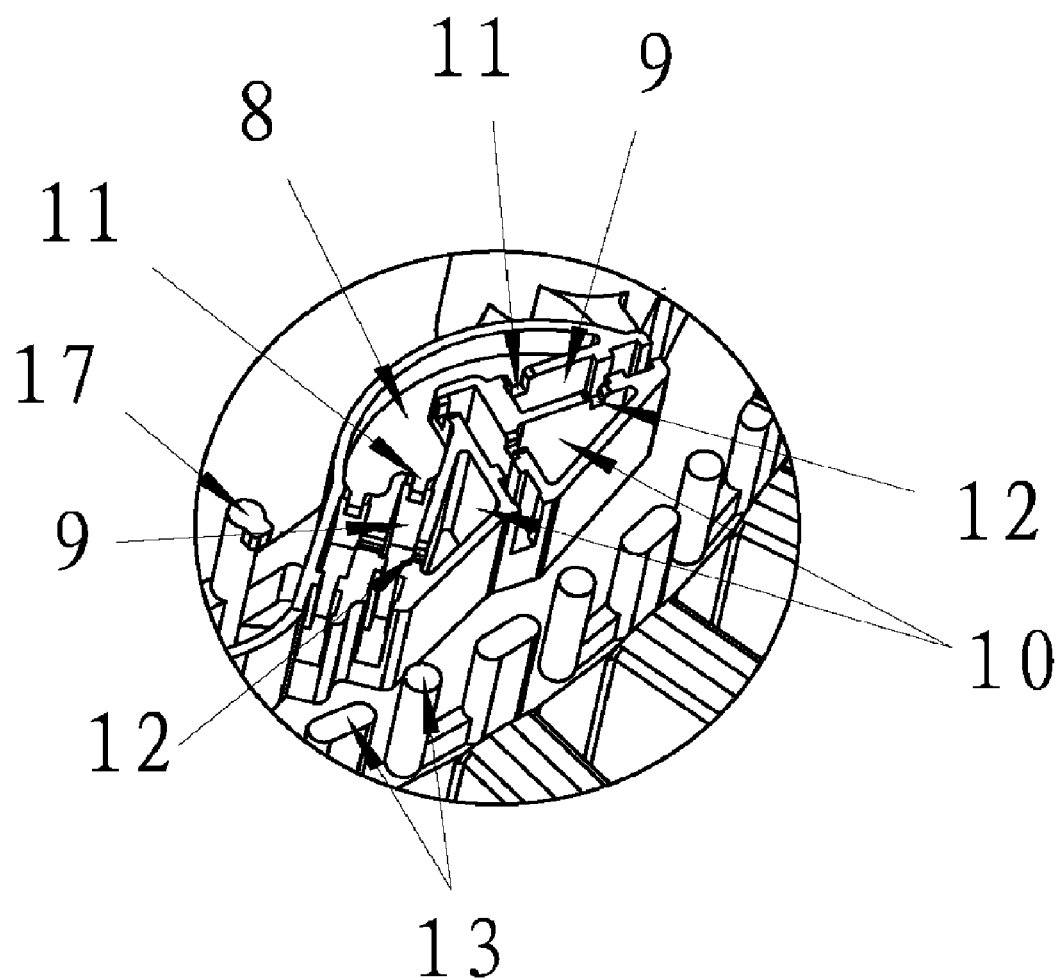
FIG. 4 is an enlarged view of a B portion of FIG. 3.
Figure 5:
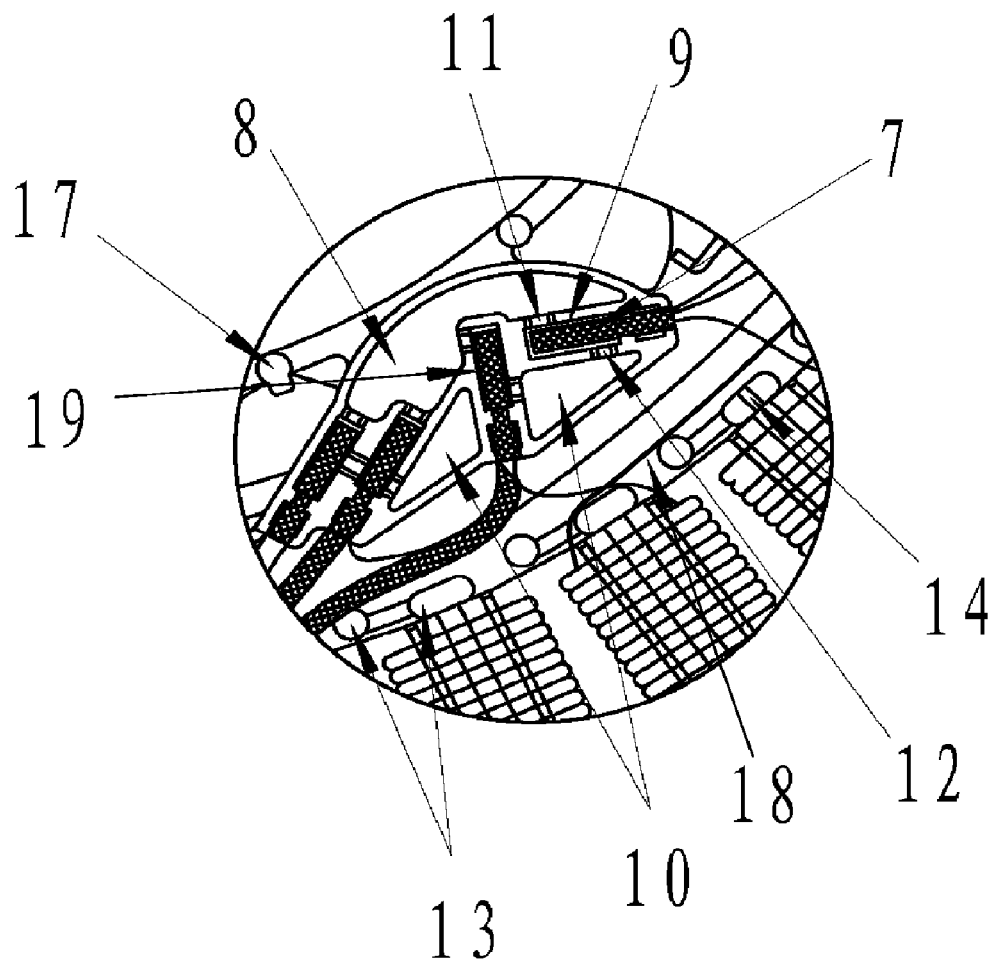

As shown in FIGS. 1-5, an injection-molded stator of the invention comprises a stator core 1, a coil winding 2 having a head, an end insulating plate 3, and a connector 7.

In this embodiment, the coil winding 2 is an enameled copper coil or an enameled aluminum coil.

The end insulating plate 3 is disposed on one end of the stator core 1.

A first groove 9, a second groove 8 and a third groove 10 are disposed on the end insulating plate 3.

The connector 7 is formed by the head of the coil winding 2 and a power lead 6 electrically connected to each other, and the connector 7 is fixed in the first groove 9 via sealant.

A first outlet 11 is disposed between the first groove 9 and the second groove 8.

A second outlet 12 is disposed between the first groove 9 and the third groove 10.

The sealant is injected from the second groove 8 and flows into the first groove 9 via the first outlet 11, whereby fixing the connector 7 in the first groove 9.

Redundant sealant in the second groove 8 flows in the third groove 10 via the second outlet 12.

A width of a middle portion of the first groove 9 is smaller than that of each of both ends thereof.

A first cylinder 17 is disposed on the end insulating plate 3, and the head of the coil winding 2 is wrapped on the first cylinder 17 before being connected to the power lead 6.

A hook is disposed on the first cylinder 17. In this embodiment, the hook is in the shape of an umbrella or a cuspate hat.

Multiple second cylinders 13 are disposed on the end insulating plate 3.

Multiple teeth 4 protrude from the side wall of the stator core 1.

A slot 5 is formed between adjacent teeth 4, and the coil winding 2 is received in the slot 5 and wrapped around the tooth 4.

A transition line 18 of an in-phase coil winding 2 between two teeth 4 is hung on the second cylinder 13.

A fourth groove 14 is disposed on any one of the second cylinders 13 and operates to prevent erroneous wire winding, and to make it convenient for operating and testing.

The coil winding 2 is connected to the power lead 6 via a terminal. A chin portion 19 is disposed in the terminal whereby penetrating an enamel leather of the coil winding 2 and electrically connecting the coil winding 2 to the power lead 6.

Multiple holes 15 are disposed on the end insulating plate 3 and the stator core 1, and each operates to receive an elastic sleeve 16.

During installation, a screw and the elastic sleeve 16 are tightly fit with each other, and thus ensuring convenient installation, accurate positioning and good shock absorbing effect, bearing axial locking force, and preventing the end insulating plate 3 from deforming or breaking.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An injection-molded stator, comprising:
    a stator core;
    a coil winding having a head;
    a first outlet;
    an end insulating plate having a first groove and a second groove; and
    a connector;
    wherein:
        said end insulating plate is disposed on one end of said stator core;
        said connector is formed by said head of said coil winding and a power lead electrically connected to each other;
        said connector is fixed in said first groove via sealant;
        said second groove is disposed on said end insulating plate and above said first groove and operates to receive said sealant; and
        said first outlet is disposed between said first groove and said second groove.

2. The injection-molded stator of claim 1, wherein said sealant in said second groove flows in said first groove via said first outlet and said sealant fixes said connector in said first groove.

3. The injection-molded stator of claim 1, wherein a third groove is disposed on said end insulating plate and in the vicinity of said first groove.

4. The injection-molded stator of claim 3, wherein a second outlet is disposed between said first groove and said third groove.

5. The injection-molded stator of claim 4, wherein redundant sealant in said first groove flows in said third groove via said second outlet.

6. The injection-molded stator of claim 1, wherein a width of a middle portion of said first groove is smaller than that of each of both ends thereof.

7. The injection-molded stator of claim 1, wherein a first cylinder is disposed on said end insulating plate, and said head of said coil winding is wrapped on said first cylinder before being connected to the power lead.

8. The injection-molded stator of claim 7, wherein a hook is disposed on said first cylinder and is in the shape of an umbrella or a cuspate hat.

9. The injection-molded stator of claim 1, wherein multiple second cylinders are disposed on said end insulating plate.

10. The injection-molded stator of claim 1, wherein:
    multiple teeth protrude from a side wall of said stator core;
    a slot is formed between adjacent teeth;
    said coil winding is received in said slot and wrapped around said tooth; and
    a transition line of an in-phase coil winding between two teeth is hung on said second cylinder.

11. The injection-molded stator of claim 10, wherein a fourth groove is disposed on any one of said second cylinders and operates to prevent erroneous wire winding.

12. The end insulating plate of claim 1, wherein said coil winding is an enameled copper coil or an enameled aluminum coil.

13. The end insulating plate of claim 12, wherein said coil winding is connected to said power lead via a terminal.

14. The end insulating plate of claim 13, wherein a chin portion is disposed in said terminal and said chin portion penetrates an enamel leather of said coil winding and electrically connects said coil winding to said power lead.

15. The end insulating plate of claim 1, wherein multiple holes are disposed on said end insulating plate and said stator core.

16. The end insulating plate of claim 15, wherein said hole operates to receive an elastic sleeve.

* * * * *